June 30, 1953     J. D. KLOPFENSTEIN     2,643,475
MACHINE FOR APPLYING DECAL FILMS TO BASE SHEETS
Filed April 22, 1950     4 Sheets-Sheet 1

INVENTOR.
Jess D. Klopfenstein
BY
Davis, Lindsey, Hibben & Noyes
Attys.

June 30, 1953 J. D. KLOPFENSTEIN 2,643,475
MACHINE FOR APPLYING DECAL FILMS TO BASE SHEETS
Filed April 22, 1950 4 Sheets-Sheet 2
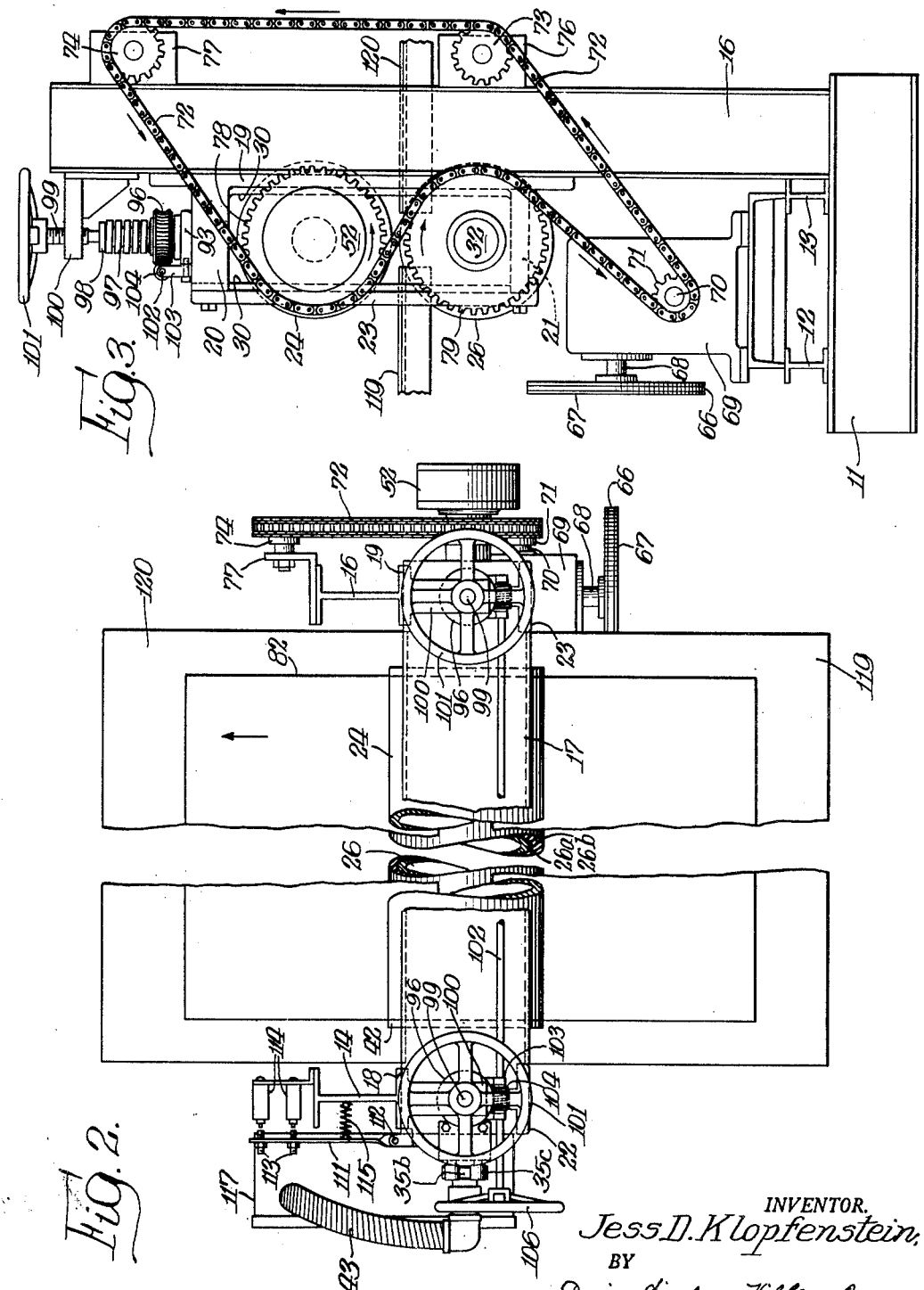
INVENTOR.
Jess D. Klopfenstein
BY
Davis, Lindsey, Hibben & Noyes
Atty's

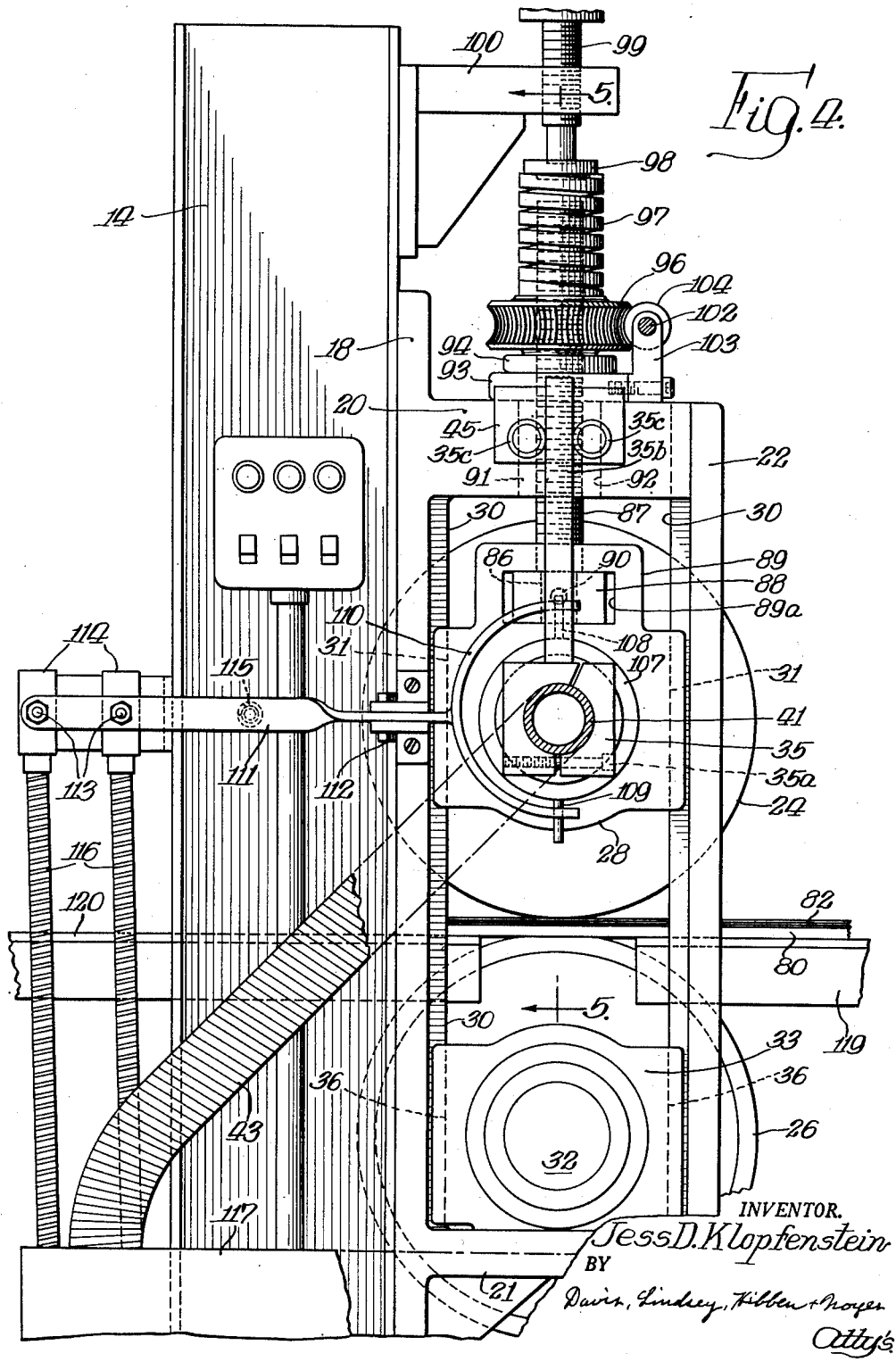

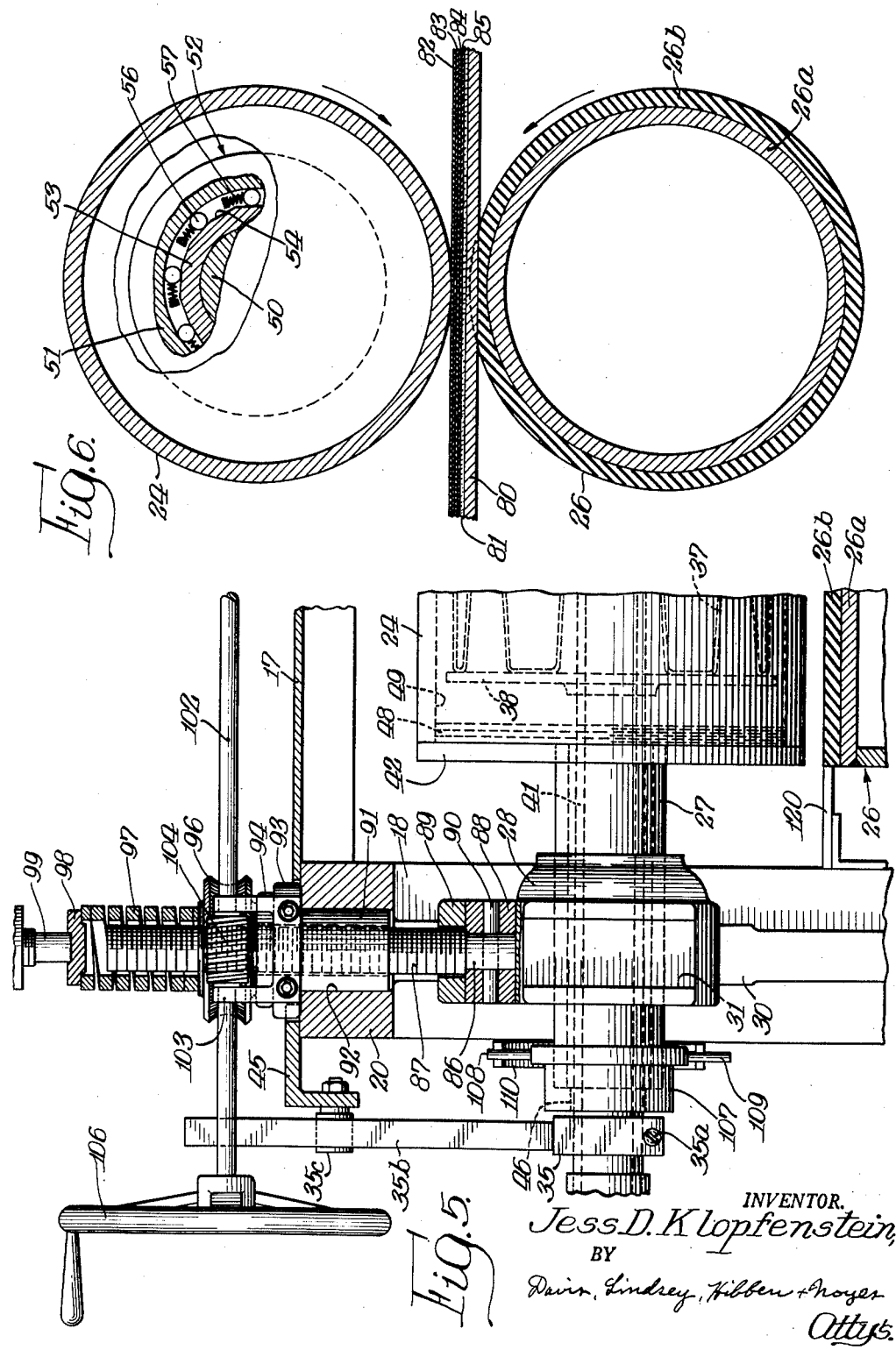

Patented June 30, 1953

2,643,475

UNITED STATES PATENT OFFICE 2,643,475

MACHINE FOR APPLYING DECAL FILMS TO BASE SHEETS

Jess D. Klopfenstein, Oak Park, Ill., assignor to The Meyercord Company, Chicago, Ill., a corporation of Illinois Application April 22, 1950, Serial No. 157,462

7 Claims. (Cl. 41—1)

This invention relates to machines for applying films to base sheets and more particularly to a machine comprising a pair of rolls for applying decalcomania transfers by heat and pressure to base sheets of wood, fibrous materials and other types of materials.

One of the objects of the present invention is to provide a machine comprising a pair of rolls through which a base sheet and a film may be passed, the rolls being so mounted and driven that both rolls may be caused to operate at the same surface speed as the film and base sheet are passing through between the rolls.

Another object is to provide a machine of the foregoing character wherein both rolls are positively driven to prevent creepage and buckling of the film relative to the base sheet as said sheet and film are initially fed into the machine and means are provided by which one of the rolls may be disengaged from its direct drive and thereafter permitted to rotate at the same surface speed as the other roll as the film and base sheet are passing therebetween to prevent distortion and creepage of the film.

Another object is to provide a machine of the foregoing character as described in the next preceding object wherein the rolls are positively driven at substantially the same rate of rotation and one of the rolls is of larger circumference than the other to thereby have a greater surface speed, there being a clutch unit in the driving mechanism for the smaller roll adapted to permit the smaller roll to rotate faster along with the larger roll at the same surface speed when the film and base sheet are passed therebetween.

A further object is to provide a machine such as that defined in the preceding object wherein the larger roll is provided with a non-skid, compressible rubber surface and the smaller roll is heated and of metal, the rubber roll after slight compression thereof as said base sheet and film are pressed between the rolls still being of a larger circumference than the metal roll.

Still another object is the provision of a machine comprising a pair of rolls in spaced, parallel relationship and means for rotatably and adjustably supporting one of said rolls under spring pressure whereby the spacing between said rolls may be readily adjusted without affecting the tension to which the roll has been set.

Other and further objects and advantages of the present invention will become apparent as this description progresses, reference being had to the accompanying drawings, in which:

Fig. 2 is a top plan view of the machine shown in Fig. 1, illustrating a sheet with a decalcomania thereover being fed through between the roll in the direction of the arrow;

Fig. 3 is a right side elevational view of the machine;

Fig. 4 is an enlarged side elevational view of the upper portion of the machine as viewed from the left side thereof;

Figure 1:
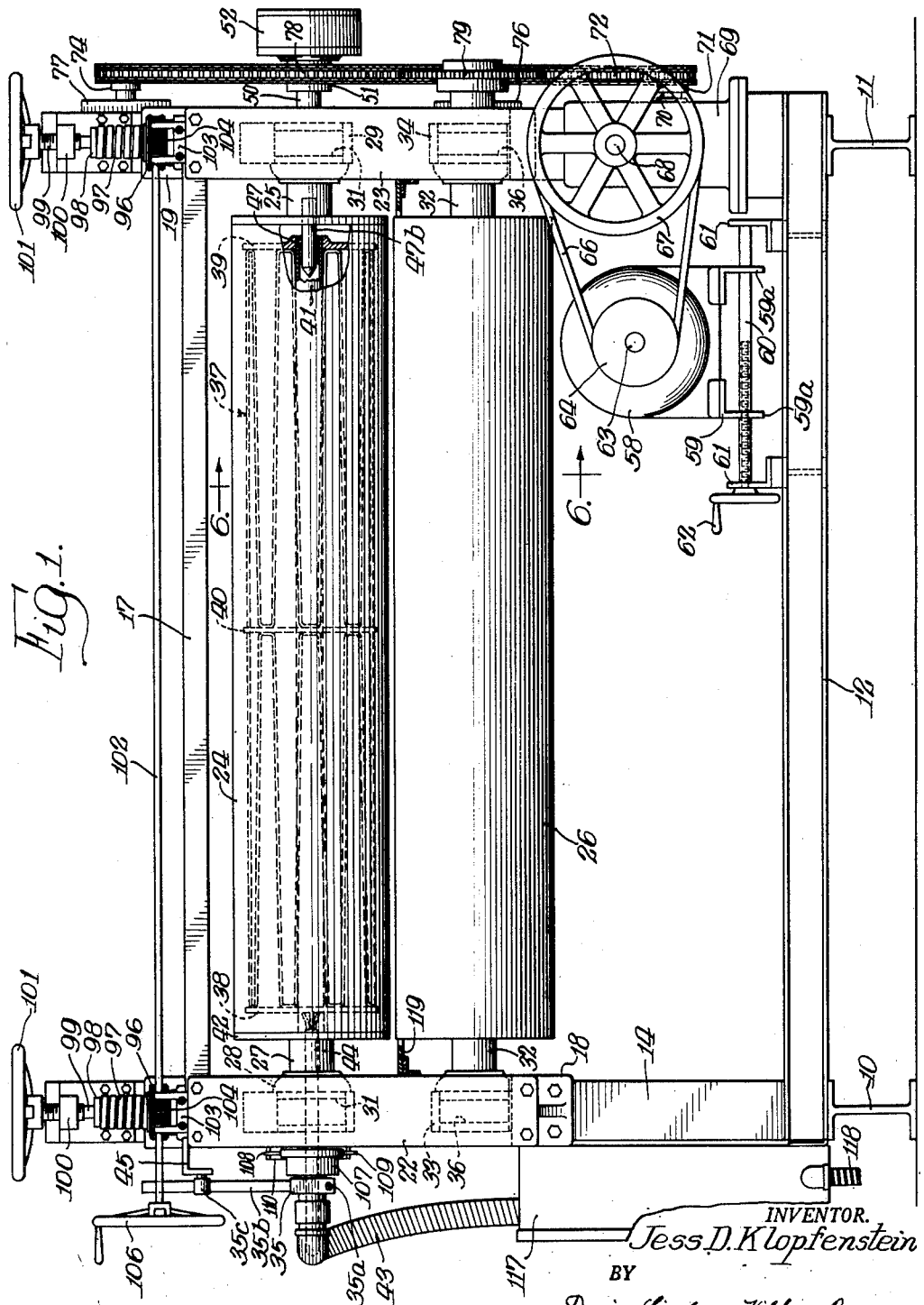
Figure 1 is a front elevational view of an improved machine for applying films, such as films of decalcomania transfers, to base sheets of wood, fibrous materials and other types of materials, comprising a preferred embodiment of the present invention.

Fig. 5 is an enlarged vertical sectional view taken on the line 5—5 in Fig. 4, looking in the direction of the arrows; and Fig. 6 is a simplified and enlarged vertical sectional view taken on the line 6—6 in Fig. 1 and looking toward the right in the direction of the arrows, with the parts broken away showing the interior construction of the overrunning clutch through which the upper roll is driven and showing a sheet of material with a decalcomania transfer being fed therethrough.

The decalcomania applying machine shown in the drawings and comprising a preferred embodiment of the present invention is supported on a stationary base frame comprising transversely extending H beams 10 and 11 at each side of the machine and spaced longitudinally extending H beams 12 and 13 welded or otherwise secured to the top sides of the transverse beams 10 and 11. Upright H beams 14 and 16 are also secured to the top side of the transverse beams 10 and 11 at the rearward portions thereof and near their upper ends they are united by a cross-bar 17. To the front sides of the upright beams 14 and 16 at their upper portions are secured plate members 18 and 19, respectively, having forwardly projecting and integrally formed horizontal arms 20 and 21 at their upper and lower ends, respectively. Vertical plates 22 and 23 are bolted to and extend between the front faces of the horizontal arms 20 and 21, and these assemblies comprising the plate 19, the arms 20 and 21 and vertical plate 23 at the right side of the machine, as viewed in Fig. 1, and the plate 18, arms 20 and 21 and vertical plate 22 at the left side of the machine serve as bearing supports for an upper roll 24 and a lower roll 26.

As shown more particularly in Figs. 1, 4 and 5 of the drawings, the upper roll 24 is mounted at its left end on a hollow stub shaft 27 and at its right end on a solid shaft 25 for rotation therewith, the shafts 27 and 25 being rotatably supported in vertically slidable bearing blocks 28 and 29, respectively, slidably mounted between the plates 18 and 22 and 19 and 23, respectively, at each side of the machine. The plates 18 and 22 and 19 and 23 are provided with vertical guide tracks 30 on their inner opposed faces which are received within vertical channels 31 in the front and rear sides of the bearing blocks 28 and 29, respectively. The channels of the bearing block 28 on the left side of the machine are somewhat wider than the guide tracks 30 of the plates 18 and 22 with which they are slidably engaged, this wider channel permitting the bearing block 28 and shaft 27 of the roll 24 to move to the left a limited distance as the roll 24 expands due to heat as will be explained more fully hereinafter.

The lower roll 26 is mounted at its ends on shafts 32 for rotation therewith and the respective ends of the shafts 32 are supported for rotative movement in bearing blocks 33 and 34 having channels 36 in their front and rear faces in which are received the vertical opposed guide tracks 30 of the plates 18 and 22 and 19 and 23. The bearing blocks 33 and 34 are thus secured against lateral movement and they are supported on their bottom sides on the lower plate arms 21 of the frame. The lower roll 26, as shown in Figs. 2 and 3, comprises an elongated metal cylinder 26a on the outer surface of which is disposed a relatively thick layer of rubber 26b. The rubber layer 26b is of such character as to be slightly compressible and by its non-skid surface is adapted to frictionally engage the under surface of a sheet of work and to drive the same through between the rolls during the transfer operation.

The upper roll 24 is a hollow metal roll which, as shown somewhat diagrammatically in Fig. 1, is heated by a plurality of heating elements 37 secured within the roll on a fixed reel comprising annular end plates 38 and 39 and an annular center plate 40 fixed to a stationary shaft 41 extending through the roll to a point adjacent the right end thereof. The shaft 41 is hollow and projects outwardly through the hollow stub shaft 27 and through the removable end plate 42 of the roll 24 and through and beyond the outer end of the hollow stub shaft 27. The outer end of the hollow shaft 41 is connected to the upper end of a flexible conduit 43 and electric wires 44 extend from the conduit into the shaft 41 and thence inwardly within the roll 24 where they are connected to the heating elements 37 through holes (not shown) in the shaft.

The shaft 41 is held against rotation exteriorly of the roll 24 by a square collar 35 fixed to the shaft by a set screw 35a, the collar having an upstanding integral bar 35b positioned at its upper portion between and in engagement with two spaced rollers 35c mounted on a bracket 45 secured to the machine frame. This arrangement prevents rotation of the shaft 41 and permits vertical adjustment thereof as will be hereinafter described. The shaft 41 is supported at its left end on a graphite bushing 46 and at its right end on a graphite bushing 47 secured within the shaft 41, and the shaft 41 is supported on a rotatable stub shaft 47b projecting inwardly within the roll 24 from the solid shaft 25. Removability of the end plate 42 is accomplished by a threaded connection 48 with the cylindrical portion 49 of the roll 24.

The heated roll 24 is driven through an overrunning clutch 52 (Figs. 1 and 6), and to this end the portion 50 of the solid stub shaft 25 which projects beyond the bearing block 29 at the right side of the machine has a reduced diameter and on this reduced shaft portion there is mounted for rotative movement relative thereto a clutch sleeve 51 of the clutch unit 52. The clutch unit 52 may be of the conventional overrunning type comprising the sleeve 51 which drives the stub shaft portion 50 through a clutch collar 53 secured on a shaft portion 50 for rotation therewith. The collar 53 on its outer periphery is provided with a series of flat portions 54 and between these flats 54 and the annular inner periphery of a radially flanged portion of the clutch sleeve 51 there are disposed a plurality of spring pressed clutch rollers 56, the springs 57 normally urging the rollers 56 into tight wedging engagement between the inner periphery of the clutch sleeve 51 and the ends of the flats, the space for the rollers being narrowest at these points. When the rollers 56 are disposed midway between the ends of the flats 54, they are not in tight engagement with the clutch sleeve 51 and hence relative rotative movement between the clutch sleeve 51, which is the driving member of the unit, and the driven clutch collar 53 is permitted.

As shown more particularly in Figs. 1, 2 and 3, the rolls 24 and 26 are each positively driven by an electric motor 58 through a chain and sprocket drive. The motor 58 is mounted on a base 59 having depending flanges 59a which in turn are supported on three spaced longitudinal bars 60 mounted between two spaced upstanding plates 61 secured across the longitudinal H beams 12 and 13. The central bar 60 is formed with a screw thread which threadedly engages a threaded opening of one of the flanges 59a and a handle 62 is secured on this threaded bar. By rotation of the handle 62, the screw bar may be rotated and the motor 58 moved longitudinally of the machine for varying the operating speed of the rolls 24 and 26 with respect to the character of the work being done and the heat of the roll 24. The motor shaft 63 drives a variable speed pulley 64, the driving diameter of which is self-adjusting by spring means as the motor 58 is moved longitudinally.

A belt 66 extends around the pulley 64 and around a larger pulley 67 fixed on the end of a rotatable shaft 68 projecting from the front of a gear box 69 housing reduction gearing (not shown) of conventional form. A rotating shaft 70 extends through the outer side of the gear box 69 and a driving sprocket 71 is secured thereto and engages an endless chain 72. The chain 72 extends rearwardly and upwardly around two vertically spaced and aligned idler sprockets 73 and 74 rotatably mounted on brackets 76 and 77, respectively, secured to the rear face of the H beam 16. From the sprocket 74 the chain 72 extends forwardly and downwardly around a large sprocket 78 fixed on the clutch sleeve 51 and thence rearwardly and downwardly around a large sprocket 79 fixed on the projecting end of the shaft 32 of the lower roll 26 and back to the driving sprocket 71. The sprockets 78 and 79 are of the same size and pitch so that the rolls 24 and 26 are driven at the same rate of speed. The idler sprocket 74 is so positioned with respect to the other sprockets and particularly sprocket 78 that sprocket 78 may be moved upwardly or downwardly for roll spacing adjustment, to be more fully explained hereinafter, without disturbing the driving efficiency between the chain and the sprocket. Upon operation of the motor 58, the chain 72 is moved in the direction of the arrows so that the upper roll 24 is rotated in a counterclockwise direction and the lower roll in a clockwise direction, as viewed in Fig. 3, thus causing any piece of work that is placed in position between the rolls 24 and 26 to be moved through to the right from the front to the rear of the machine.

As shown in the drawings, the rolls 24 and 26 are normally spaced from each other a distance slightly less than the thickness of the base sheet and the decalcomania being fed therethrough in order that the proper transferring and rolling pressure may be maintained on the work and in order that the rubber roll 26 will not be in contact with the heated roll 24 for the injurious transmission of heat therebetween. The work being passed through between the rolls 24 and 26, as shown more particularly in Fig. 6, may comprise a sheet of plywood 80 having a dry, hard coating 81 of a thermoplastic material such as nitrocellulose with a relatively high percentage of a plasticizer. The decalcomania transfer which is laid on top of the plywood sheet may comprise a paper backing 82, a thin layer 83 of polyethylene on the backing 82 which permits dry stripping of the paper backing upon application of the transfer, a thin design layer 84 of ethyl cellulose or nitrocellulose and a final thin protective coat 85 of the same material.

When the rolls 24 and 26 have been set up to a certain spacing for a certain thickness of base sheet 80 and it is desired to insert a sheet of a different thickness therethrough the upper roll 24 may be adjusted vertically by a means which will presently be described. However, in any vertically spaced position, the upper roll 24 serves as the pressure roll and is urged downwardly under spring pressure which is also adjustable to the character of the work being done and the results desired. The space adjusting means for the roll 24 is so arranged and combined with the spring pressure means that when the roll 24 is moved to a new position vertically the spring tension remains unaffected.

Referring now more specifically to Figs. 4 and 5 of the drawings, there is shown the roll height or space adjusting means and slidable mounting at the left side of the machine, but it is to be understood that the adjusting means and the slidable mounting at the right side of the machine is generally the same and the description of one side will apply to the other. The vertically slidable bearing block 28 in which the shaft 27 of the heated roll 24 is journaled, has an upper head portion 89 providing an opening 89a in which is positioned a block 88 receiving therein the lower reduced end 86 of an adjusting screw 87 secured thereto by a pin 90. The screw 87 extends upwardly through a bushing 91 fixed in a vertical bore 92 extending through the plate arm 20 and having an annular collar portion 93 resting on the upper surface of the arm 20. The screw 87 extends further upwardly through an annular thrust bearing 94, through an internally threaded worm wheel 96 serving as an adjusting nut and terminates up within but short of the upper end of a helical compression spring 97. The screw 87 is of such diameter that there is clearance between its outer periphery and the bushing 91, the thrust bearing 94 and the spring 97 so that it may move vertically relative thereto. However, the screw 87 has a threaded engagement with internal threads of the worm wheel 96 with the result that upon rotation of the worm wheels 96 at each side of the machine the screws may be moved up or down as desired, carrying with it the bearing blocks 28 and 29 and thus adjusting the roller 24 at both ends simultaneously to the desired height.

The spring 97 is tensioned between the worm wheel 96 and a thrust bearing plate 98 fixed on the end of a short adjusting screw 99 threadedly engaged in a bracket 100 secured to the front face of the H beam 14. The worm wheel 96 is thus supported by and limited by the frame against downward movement toward the lower roll 26 but at the same time it is movable, along with the sleeve 91, thrust bearing 94, bearing members 103 and worm gear 104, away from and toward the spring against spring tension as work is inserted between the rolls. A handle 101 is secured to the top end of the screw 99 and upon rotation of the handle and screw, the thrust bearing plate 98 may be adjusted vertically to increase or decrease the tension of the spring 97 and hence vary the pressure of the heated upper roll 24 against the work.

For simultaneous adjustment of both ends of the roll 24, a shaft 102 extends longitudinally of the machine between the worm wheels 96 at the right and left sides thereof and is journalled for rotative movement in upstanding bearing members 103 bolted at their lower ends to the front sides of the bushing collars 93. Adjacent each worm wheel 96, a worm gear 104 is fixed on the shaft 102 and meshes with its adjacent worm wheel to effect rotation thereof upon rotation of the cross shaft 102. A handle 106 is secured on the left end of the cross shaft 102 and upon rotation thereof the vertical height of the roll 24 from the roll 26 is adjusted through the shaft 102, worm gears 104, worm wheels 96 and screws 87. By this arrangement of parts, both the bearing blocks 28 and 29 of the roll 24 may be moved vertically simultaneously and to the same extent so that the roll 24 will be maintained in spaced, parallel relationship with the lower roll 26 in all positions of vertical adjustment.

It is to be noted, also, that each side of the roll 24 is independently adjustable to initially achieve parallel relationship between the rolls 24 and 26 when the machine is initially assembled and prepared for operation. This is accomplished by having the bearing members 103 which support the cross shaft 102 demountable from the bushing collar 93 so that either worm gear 104 may be bodily moved out of mesh with its respective worm wheel 96 after which that worm wheel 96 may be rotated by hand to raise or lower the one end of the roll 24 independently of the other. Once parallelism has been established between the rolls 24 and 26, the one bearing member 103 may be rebolted to the bushing collar 93 and thereafter both ends of the roll 24 may be raised or lowered simultaneously by rotation of the single handle 106.

In Figs. 2, 4 and 5 there is shown an automatic means for controlling the operating temperature of the heated roll 24. This means comprises a stationary sleeve 107 fixed on the stationary shaft 41 and having upstanding and depending pins 108 and 109 carried thereby and engaged with the bifurcated ends of a yoke 110. The pins 108 and 109 are slidable relative to the yoke 110 to accommodate vertical adjustment of the roll 24, the pins 108 and 109 being of such length as to permit continued engagement at all positions of vertical adjustment. The yoke 110 is carried on one end of a lever 111 which is pivoted intermediate its ends as at 112 to the H beam 14, and the lever carries on its other end portion two spaced projecting fingers 113 adapted to engage and actuate microswitches 114 in electrical circuit with the heating elements 37. The lever 111 is normally urged away from the switches by a spring 115 and the fingers 113 are adjustable relative to the lever 111 so that the extent of movement of the lever 111 before actuation of the switches 114 can be varied as desired. The extent of expansion of the roll 24 and the associated parts including the sleeve 107 is directly proportional to the temperature to which it is heated by the heating elements 37 and, hence, when the temperature of the roll goes beyond that desired for efficient operation, the roll 24 and its parts will expand to the left to such a degree that the pins 108 and 109 will force the yoke 110 to the left and rock the lever 111 so as to cause the fingers 113 to actuate the microswitches and break the electric circuit.

The switches 114 will be held in off position as long as the roll temperature remains at the high level, but upon cooling, the roll 24 and its associated parts will contract and withdraw to the right, thus reestablishing the electric circuit through the heating elements 37. The roll 24 cannot expand or move to the right inasmuch as it is fixed against such movement by the relatively tight, slidable fit between the bearing block 29, whereas expansion to the left is permitted by the wider channels in the bearing block 28, as above explained. The microswitches 114 are connected by flexible conduits 116 and wire cable (not shown) to an electrical control box 117 to which the conduit 43 is also connected, and the control box 117 is connected to a power line by a conduit 118.

In order to support the work while it is being fed between the rollers 24 and 26 and removed therefrom on the rearward side, there are two tables 119 and 120 on the forward and rearward sides of the machine, these tables being supported either from the framework of the machine or by their own independent supports (not shown).

In operation of the machine, the electric current to the heating elements 37 is first turned on to heat the roller to the desired degree of temperature, which for the materials above described, may be approximately 350° F. While the metal roller 24 is heating, the space between the rolls 24 and 26 is adjusted by rotation of the handle 106 until the space is slightly less than the thickness of the work to be fed therethrough. The spring pressure is also adjusted by rotation of the handles 101 so that the roll 24 will yieldably press down upon the work with the desired degree of pressure. The operator then selects a large sheet of plywood which may be as large as four feet wide and eight feet long, for example, having a dry coating of nitrocellulose on the top surface thereof, and thereafter places a decalcomania of the character above described and having a wood grain design, for instance, face down on the plywood, the nitrocellulose layer of the decalcomania being in engagement with the nitrocellulose coating on the plywood and the paper backing being uppermost. The decalcomania is laid loosely on the plywood and to afford rapid operation is not secured thereto by any adhesive means, clips or other fastening means.

With the electric motor 58 in operation, both the rolls 24 and 26 are caused to rotate and the plywood sheet with the decalcomania loosely placed thereon is inserted into the space between the two rolls. When the work is passing between the rolls, the lower rubber roll 26 frictionally engages the under surface of the wood sheet and pulls the work on through from the front to the back of the machine, and during this time the upper hot metal roll serves primarily as the pressure and heating roll and need not be positively driven once the work has commenced its passage through. However, it is necessary to have the upper roll 24 in rotation by a positive drive when the work is first directed into the space between the rolls because if it were at rest thus requiring the lower roll 26 to set it in motion through pressure of the work against the inertia of the roll at rest, the loose decalcomania would slip, creep or buckle relative to the plywood until the surface speeds of the rolls 24 and 26 became equal. Hence, by positively driving the roll 24 from the power source at the outset of the feeding operation, the work is readily received between the rolls and the position of the decalcomania relative to the plywood is not initially disturbed.

However, because of the practical impossibility of constructing, mounting and positively driving the two rolls 24 and 26, even from the same power source through the same size and pitch sprockets or other driving means, at the same surface speed, which difference in speed would cause creepage of the decalcomania and distortion of the design of the film, provision is made by the clutch unit 52 to declutch the roll 24 from the positive drive of its sprocket 78 as soon as the work is pressed in between the two rolls. The rubber roll 26 is of larger outside diameter than the metal roll 24 and this larger diameter still exists even when the rubber 26b is in the compressed state as shown in Fig. 6. Due to its larger diameter, the surface speed of the rubber roll 26 is greater than that of the metal roll 24 and hence the roll 24 will, as soon as the work is between the rolls and pressing upon the roll 24, commence to rotate faster at the same surface speed as the rubber roll. Thereafter, as the speed of the roll 24 is increased, the shaft 50 and the clutch collar 53 rotate ahead of the driving clutch sleeve 51 with the result that the clutch rollers 56 take up a non-wedging position in the center of the flats 54, thus permitting the roll 24 to rotate freely faster than its own sprocket speed and at the same surface speed as the roll 26. At this stage, the roll 24 is primarily an idling pressure roll and with the rolls 24 and 26 rotating at the same surface speed, the design is transferred without creepage or distortion. When the work is removed from the rearward side of the rolls, the direct driving connection between the rolls through the medium of the work is broken off and the surface speed of the upper roll 24 is decreased until the roll 24 again becomes positively driven through the clutch 52.

In the preferred embodiment of the present invention, the difference in surface speeds between the rolls 24 and 26 which is essential to effect declutching as above described is accomplished by making the roll 26 of larger diameter, but it is to be understood that other means and arrangements could be provided to accomplish the difference in surface speeds. For instance, the rolls 24 and 26 could be of approximately the same diameters and the sprocket and chain arrangement modified to rotate the lower roll 26 at a faster rate of speed so that the surface speed of the lower roll would be greater than that of the top roll 24.

As the work passes through the machine between the rollers, the heat from the roll 24 causes the thermoplastic layer 81 of the plywood sheet 80 and the thermoplastic layers 84 and 85 of the decalcomania to soften and fuse, and after the work has been removed from the machine, the paper backing 82 may be dry stripped off without the use of water since the polyethylene has little affinity for the lacquer design layer 84. The pressure of the rollers 24 and 26 is applied in substantially a line contact and causes the thermoplastic coating to flow down evenly into the minute depressions of the wood surface and at the same time the larger irregularities in the wood surface are pressed down permitting the thermoplastic coating to produce a smooth surface. Because of the line contact and the rolling pressure, the gases which are generated in the transfer and thermoplastic layers and also the air which is trapped between the decalcomania and the plywood sheet at the start of the operation, are permitted to escape ahead of the pressure line. This results in a true, smooth surface without distortion or bubbles or blisters and no finishing coat is required to establish smoothness.

The machine above described and comprising a preferred embodiment of the present invention is capable of handling sheet material such as wood, fibrous building sheets such as pressed wallboard and insulation board, and fabric material of various sizes determined by the width of the rollers, and surface designs may be readily applied thereto with satisfactory and uniform results. The machine enables relatively unskilled labor to apply a wood grain design or any designs to large or small plywood or fibrous sheets in a high speed operation, the only requirement being the alignment of the decalcomania with the edges of the sheet. The adjustment of the roll spacing may be readily made and when such adjustment is accomplished the proper spring tension is undisturbed.

Although there has been shown in the drawings and described above one form of a decalcomania applying machine comprising my invention, it is to be understood that changes in details of structure and mode of operation may be made without departing from the spirit and scope of the appended claims.

I claim:

1. Roll control means for a transfer applying machine of the type including a pair of opposed rolls between which a base sheet and a superimposed film may be passed under pressure, said control means comprising an overrunning clutch adapted to be operably connected to one of the rolls, positive drive means connected to said clutch for driving said one roll through said clutch at a predetermined surface speed, and positive drive means adapted to be connected directly to the other roll for driving the latter initially at a higher surface speed than said predetermined speed of said one roll, said clutch being operable to disrupt the driving connection between said one roll and said first-mentioned drive means in response to an increase in surface speed of said one roll.

2. Roll means for a transfer applying machine, comprising in combination a pair of opposed rolls adapted to have a base sheet and a superimposed film passed therebetween under pressure, positive drive means connected to one of said rolls for driving the latter at a predetermined surface speed, positive drive means connected to the other of said rolls for driving the latter initially at a higher surface speed than said predetermined speed of said one roll, and an overrunning clutch interposed between said one roll and said first-mentioned drive means for disengaging the same in response to an increase in surface speed of said one roll upon insertion of the work between the rolls in pressure engagement therewith whereby to permit the rolls to rotate at equal surface speeds.

3. Roll means for a transfer applying machine, comprising in combination a pair of opposed rolls one of which has a greater circumference than the other, said rolls being adapted to have a base sheet and a superimposed film passed therebetween under pressure, positive drive means connected to the smaller of said rolls for driving the latter at a predetermined surface speed, positive drive means connected to the larger of said rolls for driving the latter initially at a higher surface speed than said predetermined speed of the smaller roll, and an overrunning clutch operatively interposed between the smaller roll and its drive means, said clutch being operable to disrupt the driving connection between the smaller roll and its drive means in response to an increase in the surface speed of the smaller roll upon insertion of the work between the rolls in pressure engagement therewith whereby the smaller roll is free to overrun in the direction of its drive at the same surface speed as the larger roll.

4. The device of claim 3 further characterized in that said larger roll has a compressible exterior surface for frictionally engaging and driving the work introduced between the rolls, the circumference of said larger roll still being greater than the circumference of the smaller roll when said exterior surface is compressed due to pressure engagement of the work therewith.

5. Roll means for a transfer applying machine, comprising in combination a pair of opposed rolls adapted to have a base sheet and a superimposed film passed therebetween under pressure, yieldable means for normally urging said rolls toward each other whereby said rolls are adapted to be pressed into simultaneous rotational engagement with the work passed therebetween, positive drive means connected to one of said rolls for driving the latter at a predetermined surface speed, positive drive means connected to the other of said rolls for driving the latter initially at a higher surface speed than said predetermined speed of said one roll, and an overrunning clutch interposed between said one roll and said first-mentioned drive means for disengaging the same in response to an increase in surface speed of said one roll upon insertion of the work between the rolls in pressure engagement therewith whereby to permit the rolls to rotate at equal surface speeds.

6. The device of claim 5 further characterized in that one of said rolls is journalled in a pair of bearing members mounted for movement toward and away from the other of said rolls and having adjusting means for effecting said movement to obtain a predetermined spacing between the rolls, and said yieldable means comprises adjustable spring means coacting with said bearing members and supported independently of said bearing members to permit roll space-adjusting movement of the bearing members relative to the spring means without affecting the pressure exerted by the spring means.

7. The device of claim 6 further characterized in that each of said bearing members is suspended on a threaded shaft having an internally threaded cooperating gear for adjusting the position of the shaft and the bearing member, and said spring means comprises a helical spring surrounding the shaft and operatively engaging the gear at one end thereof and having tension adjusting means at its other end, said shaft being freely movable relative to the spring upon adjustment of the gear.

JESS D. KLOPFENSTEIN.

References Cited in the file of this patent

UNITED STATES PATENTS

| Number | Name | Date |
|---|---|---|
| 542,042 | Charter | July 2, 1895 |
| 1,741,780 | Krag | Dec. 31, 1929 |
| 2,077,253 | Nordone | Apr. 13, 1937 |
| 2,219,251 | Catini | Oct. 22, 1940 |
| 2,342,850 | Ferm | Feb. 29, 1944 |
| 2,435,369 | Simonds | Feb. 3, 1948 |